April 27, 1943.　　　W. R. TUTTLE　　　2,317,967
ELECTRIC HEATER CONTROL
Filed Nov. 22, 1937　　　4 Sheets-Sheet 1

Inventor
William R. Tuttle
By Eugene M. Giles Atty.

April 27, 1943.  W. R. TUTTLE  2,317,967

ELECTRIC HEATER CONTROL

Filed Nov. 22, 1937  4 Sheets-Sheet 2

Inventor:
William R. Tuttle
By:- Eugene M. Giles Atty.

April 27, 1943.   W. R. TUTTLE   2,317,967
ELECTRIC HEATER CONTROL
Filed Nov. 22, 1937   4 Sheets-Sheet 3

Inventor:
William R. Tuttle
By:- Eugene M. Giles Atty.

April 27, 1943.　　　W. R. TUTTLE　　　2,317,967

ELECTRIC HEATER CONTROL

Filed Nov. 22, 1937　　　4 Sheets-Sheet 4

Inventor:
William R. Tuttle.
By:
Eugene M. Giles
Atty.

Patented Apr. 27, 1943

2,317,967

UNITED STATES PATENT OFFICE 2,317,967

ELECTRIC HEATER CONTROL

William R. Tuttle, Riverside, Ill., assignor to Tuttle & Kift, Inc., Chicago, Ill., a corporation of Illinois Application November 22, 1937, Serial No. 175,797

14 Claims. (Cl. 219—20)

My invention relates to electrically energized devices, such as heating elements of electric heating and cooking appliances, and facilities for supplying current thereto and has reference more particularly to a heating element and a switch through which a number of different connections are selectively available between the heating element or portions thereof and a source of current supply to provide graded intensities of heat.

The principal objects of my invention are to provide improved facilities by which graded intensities of heat are available in electric heating and cooking appliances and the like; to increase the number of stages of heat intensity available with a two part heating unit and an ordinary 3-wire (two main lines and a neutral) feed; to insure a balanced or substantially balanced load in the various stages of heat intensity; and to provide an improved switch for electrical heating elements and the like; these and other objects being accomplished as pointed out hereinafter and as shown in the accompanying drawings, in which:

Referring to the drawings in which I have for the purpose of illustration shown my invention adapted for three intensities of heat and also for five intensities of heat, and considering first the three heat arrangement which is illustrated in Figs. 1 to 13 inclusive, the reference numeral 25 indicates the switch as a whole which comprises a casing 26 of insulating material, such as Bakelite, having a main compartment 27 for the switch elements and composed of side and end walls 28 and 29 respectively and a bottom wall 30, the latter being formed midway between the ends with a transversely elongated extension 31 forming at the bottom of the main compartment 22 a recess or auxiliary compartment 32 for escapement mechanism by which a step by step snap action is imparted to the actuating member of the switch.

A cover 33 is provided to close the open side of the switch casing 26 and is secured thereto by screws 34 engaged through the cover and into threaded openings 35 of bosses 36 formed on the inner sides of the side walls 28 and if this cover is of metal a sheet 37 of insulating material is provided at the inner side of the cover and coextensive therewith and is secured in place by by the cover screws 34. This cover 33 has a central opening 38 (and the insulation 37 a matching opening for the reduced cylindrical upper portion 39 of a square stem 40 which extends downwardly through the compartment 27 into the auxiliary compartment 32 and has a reduced cylindrical extremity 41 engaged in a bearing opening 42 in the bottom wall of the auxiliary compartment 32, the latter compartment being separated from the main compartment 27 by a metal plate 43 and a superposed plate 44 of insulating material, both of which said plates have corresponding openings through which the square stem 40 extends and in which said stem is free to rotate. These plates 43 and 44 fit marginally in a seat 45 which is formed around the top of the auxiliary compartment 36 to receive said plates therein to a depth at which the top surface of the upper insulating plate 44 is flush with the bottom of the main compartment 27 and are retained in the seat 45 by a cam 46 of insulating material which is engaged on the square stem 40 to turn therewith, said cam being in turn held on the stem by the cover 33 and its insulation 37 and the stem itself being retained in place by engagement of the cover 33 or its insulation 37 with the shoulder between the squared portion of the stem 40 and the reduced cylindrical portion 39 thereof.

A knob 47 is secured on the outer projecting portion 39 of the stem 40 for turning the stem and with it the cam 46 by which the switch contacts are controlled and an escapement mechanism is provided in the auxiliary recess 32 which cooperates with the lower end of the square stem 40 to facilitate adjustment thereof to four quarter turn positions and to releasably hold said stem in each position. This escapement mechanism comprises a pair of balls 48 which are spring pressed against opposite sides respectively of the stem 40 the faces of which are preferably formed with a flat concavity at the ball engaging location as indicated at 49 in Figs. 7 and 12 to insure positive quarter turn positioning of the stem 40 and increase the snap action in turning the stem from one quarter turn position to another. For supporting these balls 48 on the stem engaging position a pair of elongated plate springs 50 are provided in the recess 32 at opposite sides respectively of the stem 40 with their ends turned back and held in yokes 51 that depend from the plate 43, and each spring is formed midway between its ends with a ball seat 52 in which one of the balls 48 is engaged, the arrangement being such that the tension of the springs retains the balls in their respective seats 52 and holds them resiliently against the opposite sides of the stem 40 and upon turning the stem 40 from one quarter turn position to the next a spreading apart of the balls 48 occurs which forces the center portions of the springs 50 outwardly thereby increasing the tension thereof so that as the stem 40 is turned a little over half way from one quarter turn position to the next, the balls 48 exert a snap acting effect on the stem to throw it to and hold it in the said next quarter turn position.

Within the compartment 27 of the casing 26 are three leaf spring contact makers 53, 54 and 55 which also serve as electrical conductors and are arranged around the cam 46 for substantially radial movement to and from the axis of the cam and each of which is operated or controlled by the cam to make contact at appropriate times respectively with other contacts 56, 57 and 58 or 59, the latter two contacts being provided for the contact maker 55 and selectively engageable thereby.

These contacts and contact makers are mounted in the compartment 27, all at substantially the same elevation therein, in any convenient manner, as for example they may be upstanding extensions of or secured in electrical conducting relation to upstanding extensions of plate members which are secured by rivets 60 to the bottom wall 30 of the casing 26. In the present embodiment the contact maker 53 is secured at one end to an upstanding extension 61 of a plate member 62 which is secured by a rivet 60 to the bottom wall 30 at the inner side thereof and has a portion thereof projecting through a slot in the adjacent end wall 29 of the casing to provide an exposed terminal. The contact maker 53 which is thus mounted on the terminal plate member 62 is of angular form as shown and extends around a shoulder 63 of insulating material which extends upwardly from the bottom wall 30 of the casing 26 and beyond this shoulder 63 the contact maker terminates in a square loop form to accommodate therein the contact 56 with which the contact maker is normally held in engagement by its spring tension the inner side of said square loop being located adjacent the cam 46 in position to be engaged by the cam projection 64 in one quarter turn position of the stem 40 and forced and held thereby away from the contact 56.

The contact 56 is an integral upstanding extension of the plate member 65 which is secured by a rivet 60 to the outside of the bottom wall 30 to serve as a terminal and the extension 56 therefrom projects upwardly through a slot in the bottom wall 30.

The contact maker 54 is secured between its ends to an upstanding extension of a plate 66ᵃ which is in turn secured by a rivet 60 through the bottom wall 30 of the casing to a terminal plate 66 under the bottom wall and the end 67 of this contact maker is arranged at a quarter turn interval around the cam 46 from the square loop portion of the contact maker 53 opposite the contact 57, from which it is normally held in separated relation, but with which the cam projection 64 causes it to engage at the proper time. This contact 57 is a leaf spring extension from the upstanding portion of the terminal plate 68 which is secured by a rivet 60 to the under side of the bottom wall 30 of the casing 26 with said upstanding portion thereof projecting upwardly through a slot in the bottom wall 30 of the casing.

The contact maker 55 is secured at one end to the upstanding portion of a plate 69ᵃ which is in turn secured by a rivet to the terminal plate 69 on the under side of the casing bottom wall 30 and the other end of this contact maker is interposed between the contacts 58 and 59 the latter of which is an end portion of the contact maker 54 and the former of which, namely the contact 58 is an upstanding extension of the terminal plate 70 which is secured by a rivet 60 to the under side of the casing bottom wall 30 and has the said extension thereof projecting upwardly through a slot in said wall 30. Between its ends and nearer to its free end said contact maker 55 is offset so as to engage with the cam 46 at a quarter turn position from the contact 56 and a half turn position from the contact 57 and in two quarter turn positions of the cam 46 the contact maker 55, which is under a bias or constant spring tension tending to make engagement with the contact 58, is permitted to make such engagement by reason of the flat sides 71 and 72 of the cam which when either is positioned opposite the contact maker 55 leave said contact maker free to engage the contact 58. In another quarter turn position of the cam 46 the projection 64 thereof engages the contact maker 55 and forces same into engagement with the contact 59 while between the projection 64 and the flat side 72 of the cam is a curved periphery 73 which in the remaining quarter turn position of the cam 46 holds the free end of the contact maker 55 midway between the contacts 58 and 59 and out of engagement with both.

Figure 7:
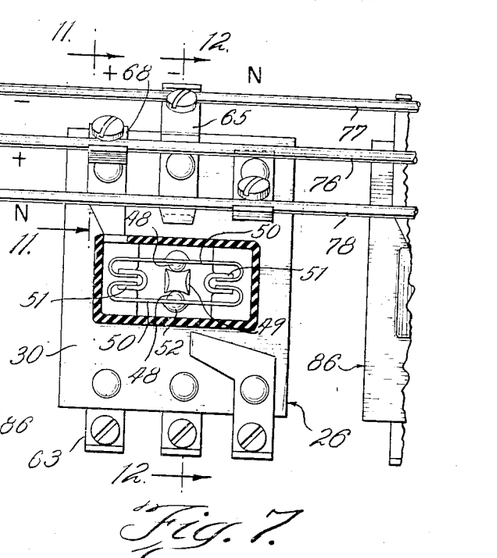
Fig. 7 is a rear view of the switch of Figs. 1 to 6 in a group with other switches showing the connection thereof with the current supply wires, the rear portion of said switch being shown in section on the line 7—7 of Fig. 2.
Figures 9, 10:
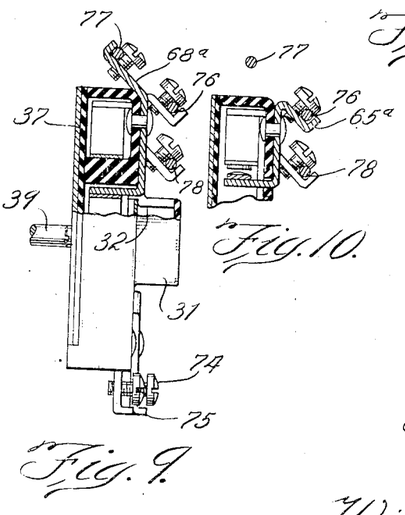
Fig. 9 is a side and part sectional view on the line 9—9 of Fig. 8.
Fig. 10 is a fragmentary sectional view on the line 10—10 of Fig. 8.
Figures 11, 12:
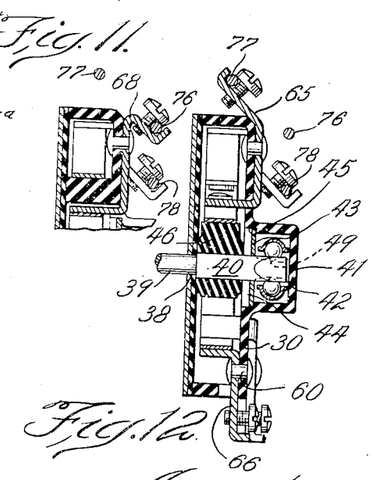
Fig. 11 is a fragmentary sectional view on the line 11—11 of Fig. 7.
Fig. 12 is a sectional view on the line 12—12 of Fig. 7.

All of the terminals 62, 66, 70, 68, 65 and 69 have binding screws 74 for securing conductors thereto and lips 75 for holding the conductors under the heads of the screws 74 and it will be noted that while the terminals 62, 66 and 70, which are the output terminals, may be and approximately are in alignment, the terminals 68, 65 and 69, which are the input terminals, have their conductor attaching portions staggered substantially as shown in Fig. 9 so that the input leads thereto may be extended across the end of the switch as shown at 76, 77 and 78 in Fig. 7, and are safely held by their attachment with these terminals in ample spaced relation to avoid accidental contact with one another or with any of the terminals 68, 65 or 69 other than the particularly one to which each lead 76, 77 or 78 is connected.

The reference numeral 79 indicates diagrammatically a heating element which may be of any conventional type and is connected at one end by a conductor 80 with the switch terminal 62 and at the other end by the conductor 81 with the switch terminal 66 and has a conductor 82 leading from the center thereof to the switch terminal 70 and providing a shunt permitting independent control of current supply to the portions 83 and 84 at opposite sides of the shunt connection 82. Obviously the shunt connection as shown is employed for simplicity as the inner ends of the portions 83 and 84 may have separate leads therefrom to the switch terminal 70, if desired.

This switch 25 is adapted to supply current to the heating element 79 from a 3-wire feed having two mains and a neutral, which are indicated herein respectively by reference numerals 76, 77 and 78 and the polarity of which is for convenience represented respectively by plus and minus symbols and the letter N and each portion 83 and 84 of the heating unit is adapted for the voltage between either main 76 or 77 and the neutral 78, for example 110, while the entire unit is adaptable for the higher voltage of 220 across the mains 76 and 77.

Figure 3:
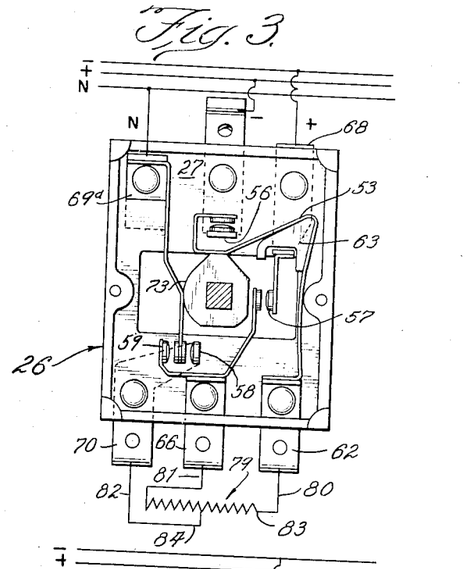
Fig. 3 is a front view of the switch with cover removed to show the contacts and operating cam and with the heating element represented diagrammatically in connection therewith—the parts being shown in this figure in the "off" position of the switch.
Figure 4:
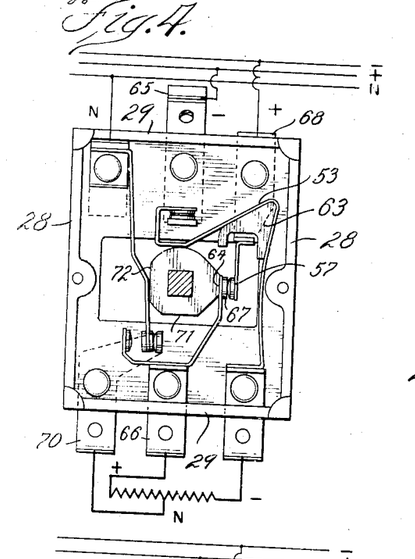
Figs. 4, 5 and 6 are views similar to Fig. 3 showing the parts respectively in the three successive "on" positions of the switch whereby three different connections are established between the source of current supply and the heating element to provide three different intensities of heat.
Figures 5, 6:
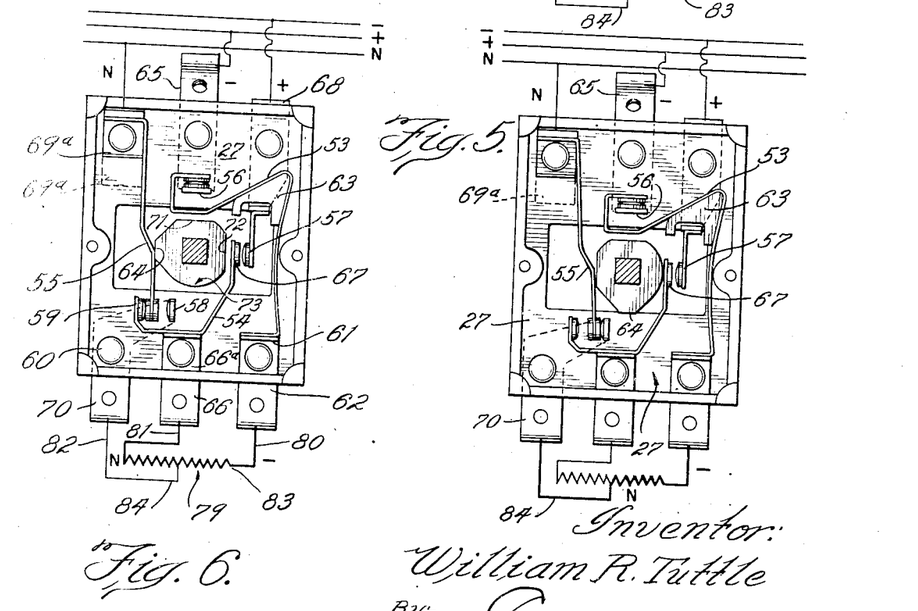

The neutral feed wire 78 is connected to the terminal 69 of the illustrated switch and the mains 76 and 77 to the terminals 68 and 65 respectively and when so connected the switch in one position, shown in Fig. 3, the connections from all of the feed wires 76, 77 and 78 to the heating unit 79 are broken so that there is no supply of current to the heating element, while in the other three quarter turn positions of the switch, shown in Figs. 4, 5 and 6 respectively, the heating unit is connected with the feed wires at each of said three quarter turn positions in a different manner to provide high, medium and low heat intensities, the high heat being effected by a quarter turn of the cam 46 clockwise from the "off" position shown in Fig. 3 to the position shown in Fig. 4, while the next quarter turn in the same direction to the position of Fig. 5 provides "medium" heat and the next quarter turn in the same direction to the position of Fig. 6 provides "low" heat, it being understood that the switch cam may be turned clockwise or counterclockwise to any desired position. Preferably the knob 47 has a pointer 85 thereon and the cover plate 33 appropriate markings such as "Off," "High," "Medium" and "Low" to indicate the four positions to which the cam 46 is adjustable and the heating condition of the heating element in each position as shown in Fig. 1.

Figure 1:
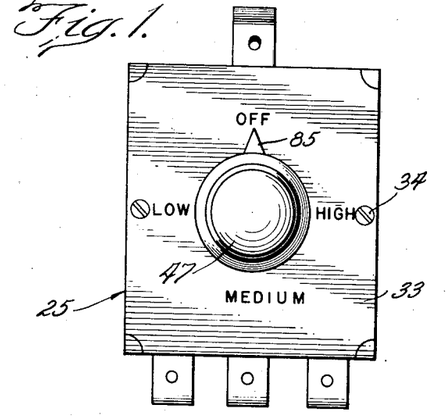
Fig. 1 is a front view of a switch constructed in accordance with this invention.
Figure 2:
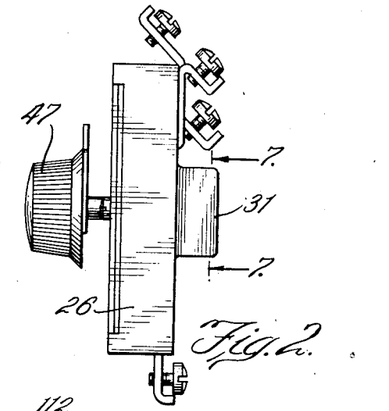
Fig. 2 is a side view of the switch of Fig. 1.

When the pointer 85 is in the position indicated in Fig. 1 the cam 46 is in the position shown in Fig. 3 in which all of the contact makers 53, 54, and 55 are separated from their contacts 56, 57, 58 and 59 and there is accordingly no current flow through the switch from the feed wires to the heating element.

When, however, the knob 47 is turned to bring the pointer to the "High" marking on the cover 33, the cam 46 will be turned to the position shown in Fig. 4 in which the contact makers 53 and 54 are closed against their contacts 56 and 57 and the contact maker 55 is closed against the contact 58 in which case the positive lead 76 is connected through the terminal 68, contact 57, contact maker 54 and terminal 66 with one end of the heating element 79 while the negative lead 77 is connected through the terminal 65, contact 56, contact maker 53 and its terminal 62 with the other end of the heating element, while the center tap 81 of the heating element is connected through the terminal 70, contact 58, contact maker 55 and terminal 69 with the neutral feed wire 78 thereby connecting the entire unit 79 across the mains 76 and 77 and the joined inner ends of the portions 83 and 84 to neutral 78. In this position both portions 83 and 84 are energized at full heat capacity and maximum heat is furnished.

When the knob 47 is turned to bring the pointer 85 to the "Medium" marking on the cover 33, the cam 46 is in the position shown in Fig. 5 in which the contact maker 54 is separated from its contact 57 and the positive feed 76 is accordingly disconnected from the heating element. The contact maker 53 is, however, engaged with its contact 56 thereby connecting the negative feed 77 through the terminal 65, contact 56, contact maker 53 and terminal 62 with the outer end of the portion 83 of the heating unit and the contact maker 55 is closed against the contact 58 so that the inner end of said portion 83 is connected by the tap 82, terminal 70, contact 58, contact maker 55 and terminal 69 to the neutral wire 78 thereby energizing only the portion 83 of the heating unit at its full heat capacity and furnishing only half the amount of heat obtained in the full heat position of Fig. 4.

When the knob 47 is turned to bring the pointer 85 to the "Low" marking on the cover 33 the cam 46 is in the position shown in Fig. 6 in which the contact maker 54, like in the medium heat position, is separated from its contact 57 and the positive feed 76 accordingly disconnected from the heating element and the contact maker 53, also like in the medium heat position is engaged with its contact 56 so that the negative feed 77 is connected with one end of the heating unit 79. In this "Low" heat position, however, the contact maker 55 is engaged with the contact 59 and the other end of the heating unit is thereby connected through the terminal 66, contact 59, contact maker 55 and terminal 69 with the neutral wire 78 so that the entire unit is connected across the 110 voltage of the positive side of the 3-wire feed and because of the resistance of the entire element 79 the heat furnished is one-half of that furnished by the portion 83 of the heating unit in the Fig. 5 position or one-quarter of that furnished in the full heat position of Fig. 4.

Obviously there is an unbalancing of the load on the source of current supply in the switch positions of Figs. 5 and 6 as the heating element in both of these positions is connected across one side only of the 3-wire feed and when a number of such heating elements are employed, as for example in electric ranges, it is desirable to so arrange them that the unbalancing effect may be minimized when several heating elements are in use. Accordingly I prefer to construct some of these switches as in the switch 86 of Fig. 8, with the main feed terminals arranged in a manner reverse to that of the Fig. 7 switch, which reversal consists in arranging the terminal 65ª in the Fig. 8 switch to connect with the positive feed wire 76 (instead of the negative feed wire) and arranging the terminal 68ª thereof to connect with the negative feed wire 77 (instead of the positive feed wire), thus permitting switches of the two forms to be arranged in line along the feed wires 76, 77 and 78 and with the contacts 57 connected in some switches by their terminals 68 with the positive feed line 76 and their contacts 56 in such cases connected by their terminals 65 with the negative feed line 77, while in other switches these contacts 57 and 56 are connected by means of the terminals 65ª and 68ª with the negative and positive feed lines respectively.

Figure 8:
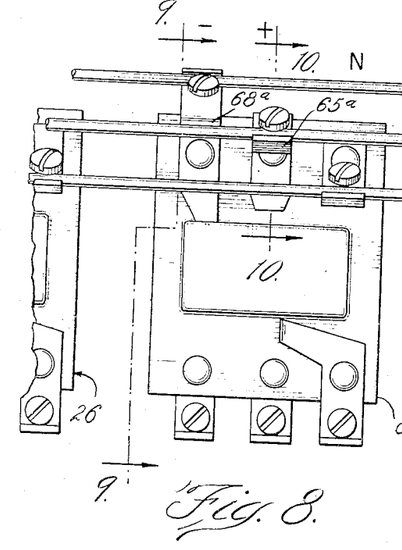
Fig. 8 is a rear view of another switch of the group which is similar to the switch of Fig. 7, but with the lead in terminals differently arranged for convenient load balancing.

Thus when a heating element, connected through a switch of the Fig. 7 form is turned to medium or low heat and another heating element connected through a switch of the Fig. 8 form is at the same time turned to medium or low heat, one of the switches supplies current to its heating element from one side of the 3-wire feed while the other switch supplies current to its heating element from the other side of the 3-wire feed, thereby insuring less unbalancing of the load than if both heating elements were supplied from the same side of the 3-wire feed for medium and low heat. These two forms of switches may be arranged alternately as indicated at 26 and 86 in the Fig. 7 and Fig. 8 assembly or in any other manner that may be found advisable to provide alternate feed line connections for those heating elements that are most likely to be used simultaneously.

Referring now to Figs. 13 to 19 inclusive which show a modification of the switch structure adapted to supply current from a 3-wire feed to a two part heating unit so as to furnish five different intensities of heat, the casing 87 of this switch is similar to that of the switch previously described and has a compartment 88 for the switch mechanism and an auxiliary recess 90 for the escapement mechanism. The stem 91 is rotatably mounted in the same manner as the stem 40 of the three heat switch, but the lower portion thereof within the recess 90 is of hexagonal form with six concave faces 92 engaged by the spring pressed balls 48 of the escapement mechanism which is otherwise the same as that of the previously described three heat switch. Thus the stem 91 has six positions at 60 degree intervals in the rotation thereof in which the stem is releasably held against turning movement and is provided with a cam 93 thereon in the casing compartment 88 for operating contact makers by which the five different intensities of heat are effected. This stem has a knob thereon as in the previous structure for turning the stem 91 and with it the cam 93 and a pointer is also provided which cooperates with markings on the casing cover to indicate the six different switch positions, one of which may be designated as the "Off" position and the other five may be designated in any manner to indicate the high and low and three intermediate stages of heat intensity.

Within the compartment 88 are five contact makers 94, 95, 96, 97 and 98 of leaf spring form mounted respectively on upstanding portions of plate members 99, 100, 101, 102 and 103 which are secured to the bottom wall of the casing 87 in any convenient manner and these contact makers are operated or controlled by the cam 93 to engage at proper times respectively with contacts 104, 105, 106, 107 and 108, another contact 109 being also provided with which the contact maker 94 engages, said contact 109 being an upward extension of a plate 109ª which extends under the bottom wall of the compartment 88 and is secured through said wall in any convenient manner to the plate member 100 so that the contact 109 is in electrical connection with said plate 100 and its contact maker 95. The contact 107 and contact maker 98 are also electrically connected as the contact 107 is integral with the plate member 103 to which the contact maker 98 is secured. The contact 106 projects upwardly from a plate 110 which is secured to the bottom wall of the casing 87 and has a lug 111 projecting downwardly through said bottom wall and secured by a rivet 112 to a strap extension 113 of the plate 114 which is secured to the bottom of the casing 87 at the opposite side of the compartment 88 and has an upstanding support 115 to which is secured a spring loop 116 with the contact 108 at the free end, said contact 108 being thus electrically connected by the strap extension 113 with the contact 106. The spring loop 116 has the free arm thereof engaged under spring tension against an insulating stop 117 which projects upwardly from the bottom wall of the compartmtnt 88 to hold the contact 108 in position for engagement by the contact maker 98 and permit it to yield to the pressure of the contact maker.

The contacts 104 and 105 are also supported on the free ends of spring loops 118 and 119 respectively which have their free arms held under spring tension against insulating stops 120 and 121 respectively, the spring loop 118 being supported on an upward extension of the plate member 122 which is secured to the bottom wall of the compartment 88 and the spring loop 119 being an extension of, and the contact 105 thereof accordingly being electrically connected with, the contact maker 96 which is also spring held against an insulating stop 123. Similar stops 124 and 125 are also provided for the contact makers 95 and 98 respectively and there is an insulating barrier 126 extending upwardly from the bottom wall of the compartment 88 between the contact maker 97 and the contact maker 96.

The cam 93 is of generally circular form with a projection 127 and has two recesses 128 and 129 in its peripheral face, the projection 127 of which engages each of the contact makers 94, 95, 96, 97 and 98 at certain times in the rotation of the cam and the recesses 128 and 129 of which cooperate only with the contact maker 94 to permit this contact maker at certain times in the rotation of the cam to swing inwardly toward the axis of the cam 93 to engage the contact 109, said contact maker 94 being biased or under spring tension to insure such engagement when the cam recess 128 or 129 is opposite the cam engaging portion of the said contact maker.

In connection with this switch a heating element 130 is employed which is similar to that used with the three heat switch except that the portions 131 and 132 thereof at opposite sides of the center tap 133 are adapted for 220 voltage, and this heating element has one end connected by the wires 134 and 234 respectively with the plate members 114 and 122 and the other end connected by the wire 135 with the plate member 102 and a center tap 133 connected with the plate member 100. A 3-wire feed with two mains 136 (represented as positive) and 137 (represented as negative) and a neutral 138 (represented by the letter "N") is connected with this switch to supply current to the heating element 130, the positive feed 136 being connected to the plate member 103 of the switch, and the negative feed 137 being connected to the plate member 99 of the switch and the neutral 138 being connected to the plate member 101 of the switch.

Figure 13:
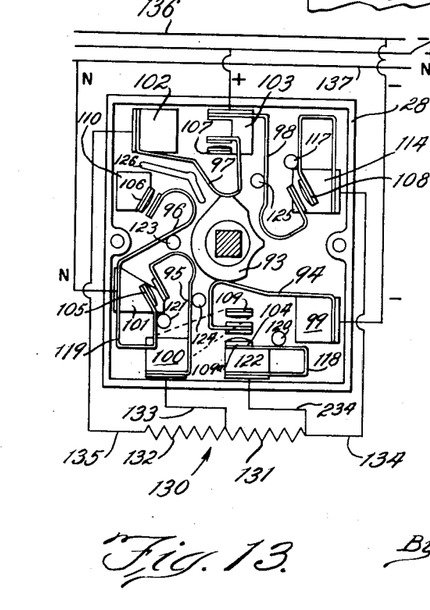
Fig. 13 is a view similar to Fig. 3 showing a modified form of switch in the "off" position.

When so connected, if the switch operating knob is in the off position in which the cam 93 is in the position shown in Fig. 13, no current is supplied to the heating unit as all of the contact makers are out of engagement with their contacts, the contact maker 97 being at that time held away from its contact 107 by the cam projection 127 and the contact maker 94 being held away from its inner contact 109 by engagement with the curved peripheral surface of the cam.

Figure 14:
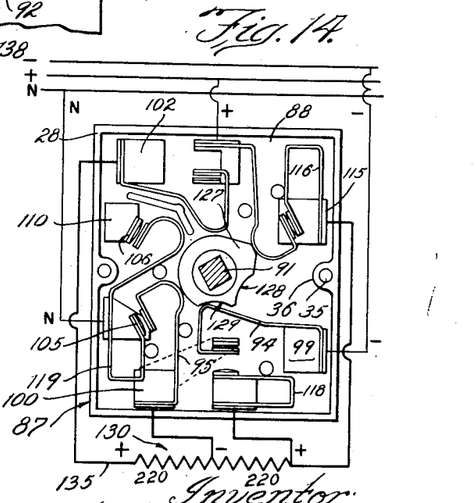
Figs. 14 to 18 inclusive are views similar to Fig. 14 showing the switch parts respectively in the five successive "on" positions of the switch.
Figure 19:
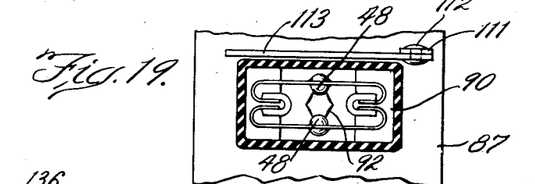
Fig. 19 is a fragmentary rear view of the switch structure of Figs. 13-18 inclusive showing the escapement mechanism thereof.

Upon turning the switch operating knob and with it the cam 93 in a clockwise direction 60 degrees, or one step as determined by the escapement mechanism of Fig. 19, to the position shown in Fig. 14, the contact makers 95 and 96 remain disengaged from their contacts 105 and 106 whereas the contact maker 97, being then released from the cam projection 127, is caused by its own spring tension to engage the contact 107 and the contact maker 98 by the engagement of the cam projection 127 therewith is engaged with the contact 108 while the contact maker 94, then having the cam recess 129 opposite the cam engaging portion thereof, is engaged by its own spring tension with the contact 109. Thus the positive lead 136 is connected through the plate member 103, contact maker 97, and plate member 102 with one end of the heating element 130 and said positive lead is also connected through the plate member 103, contact maker 98, contact 108, spring 116 and plate member 114 with the other end of said heating element, while the center tap 133 of the heating element is connected through the plate member 100, connector 109a, contact 109, contact maker 94 and plate member 99 with the negative lead 137 so that both portions 131 and 132 of the heating element are connected in parallel across the main leads 136 and 137 and each supplied with current at 220 volts so that the heating element at that time furnishes the maximum heat, and it is to be noted that in this maximum or "high" heat position the load is balanced.

Figure 15:
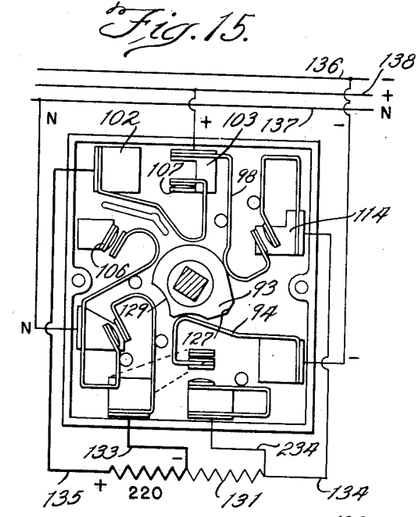

When the cam 93 is turned another 60 degree step in a clockwise direction to the position shown in Fig. 15, the contact maker 97 remains engaged with the contact 107 thereby retaining the previous connection of the positive lead 136 with the outer end of the portion 132 of the heating element, and in this position the contact maker 94 is also engaged with the contact 109, due to the advance of the cam recess 128 to a position opposite the cam engaging portion of the contact maker 94 so that the negative lead 137 is connected as previously with the center tap 133 of the heating element. In this position both contact makers 95 and 96 remain separated from their contacts 102 and 106 and there is accordingly no connection of the neutral lead 136 with the heating element and as the movement of the cam projection 127 away from the contact maker 98 has released the latter from the contact 108 there is no current supply to the outer end of the portion 131 of the heating element, the other portion 132 only being supplied with current which at the 220 voltage of this supplied current furnishes one half the maximum amount of heat of the Fig. 14 high heat adjustment, and it is to be noted that in this switch position also the load is balanced.

Figure 16:
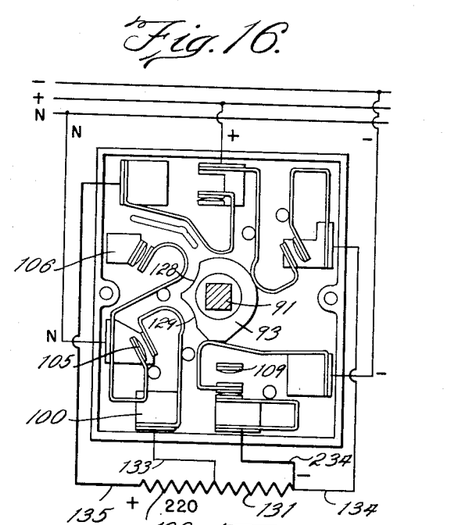

Upon turning the cam 93 another 60 degrees in a clockwise direction to the position shown in Fig. 16 the contact maker 97 remains engaged with the contact 107 thereby retaining the previous connection of the positive lead 136 with the outer end of the portion 132 of the heating element and the contact makers 95, 96 and 98 remain disengaged from their contacts 105, 106 and 108 so that there is no connection of the neutral wire 138 with the heating unit. The cam projection 127 has, however, moved into position to engage and hold the contact maker 94 in engagement with the contact 120 thereby connecting the negative lead 137 through the plate member 99, contact maker 94, contact 120, spring 118 and plate member 122 with the outer end of the heating element portion 131 so that current at 220 volts is supplied to the entire heating element in series through the portions 131 and 132 thereof causing the heating element 130 to produce one-fourth of the maximum amount of heat of the Fig. 14 high heat adjustment, and it is to be noted that in this switch position the load is also balanced.

Figure 17:
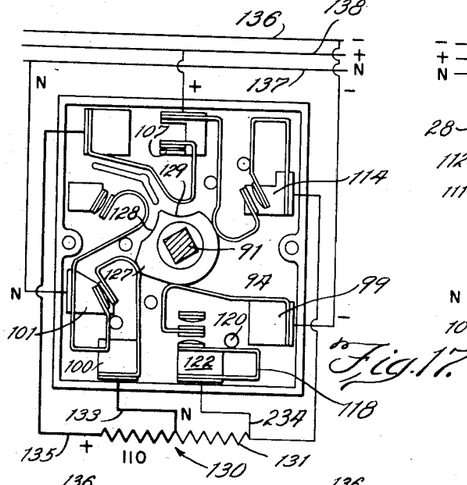

Upon turning the cam 93 another 60 degrees in the clockwise direction to the position shown in Fig. 17 the contact maker 97 remains engaged with the contact 107 thereby retaining the previous connection of the positive lead 136 with the outer end of the portion 132 of the heating element and in this position the contact makers 98, 94 and 96 are disengaged from their contacts while the contact maker is caused by engagement of the cam projection 127 therewith to engage its contact 105, thereby connecting the neutral lead 138 through the plate member 101, spring 119, contact 105, contact maker 95 and plate member 100 with the center tap 133 of the heating element so that current is supplied only to the portion 132 of the heating element and at 110 volts thereby causing the heating element to produce one-eighth of the maximum amount of heat of the Fig. 14 high heat adjustment and it is to be noted that in this switch position the load on the 3-wire current supply system is only one-eighth off balance.

Figure 18:
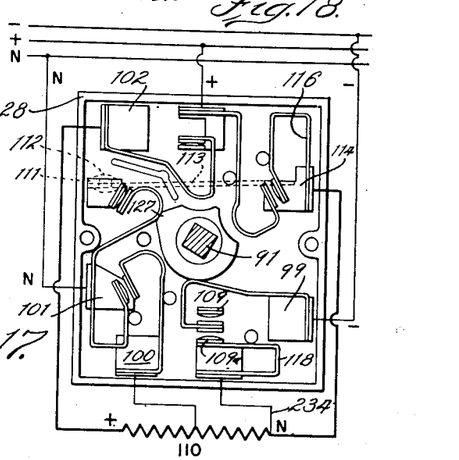

When the cam 93 is turned another 60 degrees in the clockwise direction to the final operating position of Fig. 18, the contact maker 97 remains engaged with the contact 107 thereby retaining the previous connection of the positive lead 136 with the outer end portion 132 of the heating element and in this position the contact makers 98, 94 and 95 are disengaged from their contacts while the contact maker 96 is caused by engagement of the cam projection 127 therewith to engage its contact 106 thereby connecting the neutral lead 138 through the plate member 101, contact maker 96, contact 106, plate member 110, cross connector 113 and plate member 114 with the outer end of the portion 131 of the heating element so that current at 110 volts is supplied to the entire heating unit, thereby causing the heating element to produce one-sixteenth of the maximum heat of the Fig. 14 high heat adjustment, and it is to be noted that in this switch position the load is also one-eighth off balance.

Thus with this six point switch and the described connections thereof with the heating unit, five different intensities of heat are available with the load unbalanced only in two positions and in these two positions only to the extent of one-eighth.

Figure 21:
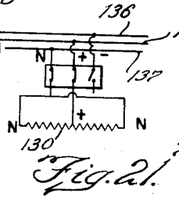

A connection for one-fourth heat may be provided with the heating element 130 as shown in Fig. 21 by connecting the neutral wire 138 to the opposite ends of the element and one of the main lines, for example the positive feed 136 with the center tap of the heating element, although this is less desirable than the one-fourth heating arrangement of Fig. 16 inasmuch as the load is one-fourth off balance in the Fig. 21 arrangement whereas the load is balanced in the Fig. 16 arrangement.

Figure 20:
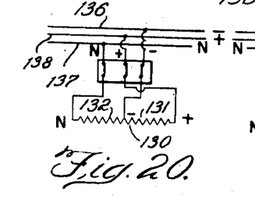
Figs. 20 and 21 are diagrammatic views showing respectively a five-eighths heat connection and a quarter heat connection.

Also a connection for five-eighths heat may be provided with the heating element 130 as shown in Fig. 20 by connecting the neutral wire 138 to one end of said element and one of the main feeds, for example, the positive feed 136 with the other end of the element 130 and the other main feed, namely the negative feed 137 with the center tap of the element 130 thereby supplying current at 220 volts to the portion 131 of the element and current at 110 volts to the portion 132 of the element with the load one-eighth off balance.

While I have shown and described my invention in a preferred form, I am aware that various changes and modifications may be made therein without departing from the principles of my invention, the scope of which is to be determined by the appended claims.

I claim as my invention:

1. In an electrical heating apparatus which is selectively adjustable for receiving different amounts of energy from different potential conductors, the combination of a heating unit comprising a pair of resistances joined in series, a pair of separated contacts of which the first is connected with the junction of said resistances and of which the second is connected with the outer end of one of said resistances, a contact maker connected with one of said conductors and biased for engagement with one of said contacts but displaceable into engagement with the other contact, a second contact pair of which one contact is connected with another of the conductors and of which the other contact is connected with the outer end of the other resistance, a contact maker arm in support of one of the contacts of the second pair and biased for closing said second pair contacts but displaceable to separate them, a cam having a profile disposed cooperatively with said contact makers in a common plane therewith and rotatable about an axis normal to said plane, the cam profile comprising spaced sections of relatively long, short and intermediate radius and operable when in cooperative relation with the first contact maker to respectively displace it into engagement with said other contact of the first pair, to permit its engagement with the contact toward which it is biased and to displace it into a position between and out of engagement with either of said contacts, the cam section of longer radius also being operative when moved into cooperative relation with the second contact maker to displace the same for separating the second contact pair, and the spacing of said cam profile sections being such with respect to the contact makers that the profile section of intermediate radius is in cooperative relation with the first contact maker while the profile section of longer radius is in cooperative relation with the second contact maker wherefore no circuit is completed between the heater unit and the conductors, and that the profile section of longer radius is removed from the second contact maker while either of the profile sections of shorter or longer radius are in cooperative relation with the first contact maker wherefore said other conductor will be connected through the second contact pair with the outer end of said other resistance either while said one conductor is connected with the junction of said resistances through the first contact maker and the first contact of the first contact pair or while said one conductor is connected with the outer end of the one resistance through said first contact maker and the second contact of the first contact pair.

2. In an electrical heating apparatus which is selectively adjustable for receiving different amounts of energy from conductors at different potentials, the combination of a heating unit comprising a pair of resistances jointed in series, a pair of first and second separated contacts respectively connected with the junction of said resistances and with the outer end of one thereof, a first contact maker connected with a first of said conductors and having a section biased for engagement with the first of said separated contacts but displaceable into engagement with the second, a third contact connected with a second of said conductors, a second contact maker connected with the outer end of the other of said resistances and having a section biased for engagement with said third contact but displaceable out of such engagement, said contact makers each having a cam follower section, and a cam member having a profile in a plane common to said cam follower section and rotatable about an axis normal to such plane, said cam profile including sections of relatively long, short and intermediate radius arranged in the order named about said cam member in the direction of its rotation, and said profile sections being so spaced that in one position the section of long radius registers with the cam follower section of the second contact maker to hold it from engagement with the third contact and the section of intermediate radius registers with the cam follower section of the first contact maker to hold it from engagement with the first of said separated contacts and in a position between said separated contacts to isolate said conductors from said resistances, that in an advanced rotational position of said cam said long radius profile section is removed from registry with the cam follower section of the second contact maker to permit its biased engagement with the third contact and the short radius profile section registers with the cam follower section of the first contact maker to permit its biased engagement with said first separated contact wherefore said conductors are connected across the one of said resistances, and that in a still further advanced rotational position of the cam member the long radius profile section is again out of registry with the cam follower section of the second contact maker to permit its engagement with the third contact and is in registry with the first contact maker to displace it into engagement with the second of said separated contacts wherefore said conductors are connected across the series arrangement of said resistances.

3. In an electrical heating apparatus which is selectively adjustable for receiving different amounts of energy from conductors at different potentials, the combination of a heating unit comprising a pair of resistances joined in series, a pair of first and second separated contacts respectively connected with the junction of said resistances and with the outer end of one of said resistances, a first contact maker connected with a first of said conductors and having a section biased for engagement with the first of said separated contacts but displaceable into engagement with the second, a third contact connected with a second of said conductors, a second contact maker connected with the outer end of the other of said resistances and having a section biased for engagement with said third contact but displaceable out of such engagement, a fourth contact connected with a third of said conductors, a third contact maker also connected with the outer end of said one resistance and having a section engageable with the fourth contact but biased out of such engagement, said contact makers having respective cam follower sections spaced substantially upon an arc within a common plane, and a cam member having a profile embraced by said cam follower sections within said plane and rotatable about an axis normal to such plane, the profile of said cam including sections of relatively long, short and intermediate radius arranged in the order named about said cam in the direction of its rotation, said profile sections being disposed for successive registry with each of said contact makers at their cam follower sections in a complete rotation of the cam and being of such radius that only the longer radius section displaces the second contact maker out of its biased engagement with the third contact and the third contact maker into engagement with the fourth contact, and said profile sections being so spaced that in one position the section of longer radius registers with the second contact maker to displace it from the third contact and the section of intermediate radius registers with the first contact maker to displace it from engagement with the first of said separated contacts and into a position between said separated contacts wherefore no circuit is completed between said conductors and the resistances, that in an advanced rotational position of the cam said longer radius profile section is removed from registry with the second contact maker to permit its biased engagement with the third contact and is in registry with the third contact maker to displace it into engagement with the fourth contact and said shorter radius profile section registers with the first contact maker to permit its biased engagement with said first separated contact wherefore the first and second conductors are connected across said other of the resistances and the first and third conductors are connected across said one of the resistances, that in a further advanced rotational position of the cam the longer radius profile section is removed from both the second and third contact makers to permit the biased engagement of the second contact maker with the third contact and the biased displacement of the third contact maker from the fourth contact and the short radius profile section registers with the first contact maker to permit the biased engagement of the first contact maker with the first of said separated contacts wherefore the first and second conductors are connected across said other resistance, and that in a still further advanced position of the cam the longer radius profile section is in registry with the first contact maker to displace it into engagement with the second of the separated contacts and to permit the biased engagement of the second contact maker with the third contact and the biased displacement of the third contact maker from the fourth contact wherefore the first and second conductors are connected across the series arrangement of said resistances.

4. In an electrical heating apparatus which is selectively adjustable for receiving different amounts of energy from conductors at different potential, the combination of a heating unit comprising a pair of resistances joined in series, a first contact pair of which the contacts are respectively connected with one of said conductors and with the junction of said resistances, one of the contacts being biased from engagement with the other but being displaceable into such engagement, a second contact pair of which the contacts are respectively connected with said one of the conductors and with the outer end of one of said resistances and of which contact pair one of the contacts is biased from engagement with the other but is displaceable into such engagement, a third pair of normally closed contacts respectively connected with another of said conductors and with the outer end of the other resistance and of which third pair contacts one is displaceable from such engagement, first second and third contact makers respectively carrying said displaceable contacts in the order named and each presenting a section substantially tangentially to a common arc, a cam member having a profile disposed cooperatively with said tangential sections in a plane common therewith and rotatable about an axis coincident with the radial focus of said arc, said cam profile including sections of relatively long and short radius of which the long radius section when disposed cooperatively with the contact makers of either of the first two displaceable contact is operative to displace such contacts for closing their contact pair and when disposed cooperatively with the contact maker of the third displaceable contact is operative to displace such contact for opening its contact pair, and of which profile sections said short one when disposed cooperatively with the contact makers of either of the first two displaceable contacts permits the biased disengagement of their contact pair and when disposed cooperatively with the contact maker of the third displaceable contact permits the normal engagement of its contact pair, and the spacing of said cam profile sections being such with respect to the contact makers that the profile section of short radius is in cooperative relation with the third contact maker while the section of long radius is in cooperative relation with either of the first or second contact makers.

5. In a device of the class described, the combination with a two part resistor of a switch through which current is supplyable to the resistor from a three wire feed, said switch having three input terminals to which the three feed wires are respectively connected and having three output terminals one of which is connected to an end of each part of the resistor and the other two of which are connected respectively to the other ends of the two parts of the resistor, a rotatable actuator adjustable to five consecutive positions in which current is supplied to the resistor and to an additional consecutive position in which current supply to the resistor is interrupted, a plurality of contact makers bearing against the periphery of the actuator at intervals therearound and individually adjustable thereby substantially radially to and from the axis of the actuator to provide respectively in the aforesaid five consecutive positions of the actuator five different groups of two or more paths each between the input and output terminals.

6. In a device of the class described, the combination with a two part resistor of a switch through which current is supplyable to the resistor from a three wire feed, said switch having three input terminals to which the three feed wires are respectively connected and having three output terminals one of which is connected to an end of each part of the resistor and the other two of which are connected respectively to the other ends of the two parts of the resistor, a rotatable actuator adjustable to five consecutive positions in which current is supplied to the resistor and to an additional consecutive position in which current supply to the resistor is interrupted, a plurality of contact makers bearing against the periphery of the actuator at intervals therearound and individually adjustable thereby substantially radially to and from the axis of the actuator to provide respectively in the aforesaid five consecutive positions of the actuator five different groups of two or more paths each between the input and output terminals, at least one of said contact makers remaining in the same position in several of the six different positions of the actuator.

7. In an electrical heating apparatus of the class described energizable from conductors at different potentials, the combination of a sectional heating unit, and mechanism for connecting the sections of said heating unit in different combinations across said conductors to obtain different amounts of heat energy, said mechanism comprising means affording a plurality of electrical conductor paths each comprising a pair of contacts and leading selectively from certain of said conductors and selectively to certain heating unit sections, at least one contact in each pair being displaceable for determining the opened or closed condition of its respective path, one of said paths being universally cooperable with several of the other paths for completing circuits between various heating unit sections and the conductors, and a contact actuator member having a peripheral profile cooperable with a displaceable contact of each pair and movable into a plurality of positions to control the displacement of said contacts and thus determine the combinations of said paths which are connected in circuit, the contacts in said universal path being normally closed, and the contour of said profile being such that said normally closed contacts are undisturbed pursuant to the advancement of said actuator member into a plurality of successive positions.

8. In an electrical heating apparatus of the class described energizable from conductors at different potentials, the combination of a sectional heating unit, and mechanism for connecting the sections of said heating unit in different combinations across said conductors to obtain different amounts of heat energy, said mechanism comprising means affording a plurality of electrical conductor paths each comprising a pair of contacts and leading selectively from certain of said conductors and selectively to certain heating unit sections, at least one contact in each pair being displaceable for determining the opened or closed condition of its respective path, at least one of said paths being excluded from certain combinations of said paths for completing circuits between various heating unit sections and the conductors and included in another of said combinations, and a contact actuator member having a profile cooperable with a displaceable contact of each pair and movable into a plurality of positions to control the displacement of said contacts and thus determine the combinations of said paths that are connected in circuit, the contacts in said one path being normally open, and the contour of said profile being such that said normally opened contacts are undisturbed pursuant to the advancement of said actuator member into a plurality of successive positions.

9. In an electrical heating apparatus connectible to a plurality of conductors different pairs of which provide different electromotive forces, the combination of a plurality of resistors, switch means having a common operating means in the form of a rotary cam and a plurality of independently movable elements at intervals therearound and selectively operable by said cam, and means, including electrical connections, so constructed and arranged that said switch means is adapted to interconnect one or more of said resistors and one or more of said pair of conductors in different relationships for different positions of said common operating means respectively.

10. In an electrical heating apparatus connectible to a plurality of conductors different pairs of which provide different electromotive forces, the combination of a plurality of resistors, switch means having a common operating means in the form of a rotatable cam, and a plurality of independently movable elements at intervals therearound, said common operating means being movable from one position to a plurality of successive positions in all of which successive positions one of the movable elements remains in the same position and in at least two of which said successive positions others of the movable elements remain in the same position, and means, including electrical connections, so constructed and arranged that said switch means is adapted to interconnect one or more of said resistors and one or more of said pairs of conductors in different relationships for different positions of said common operating means respectively.

11. In an electrical heating apparatus connectible to a plurality of conductors different pairs of which provide different electromotive forces, the combination of a plurality of resistors, switch means consisting of a common operating means in the form of a rotary cam, and a plurality of independently movable elements associated with and selectively operable by said cam, and means, including electrical connections, so constructed and arranged that said switch means is adapted to interconnect one or more of said resistors and one or more of said pairs of conductors in different relationships for different positions of said common operating means respectively.

12. In a device of the class described, the combination with a two part resistor of a switch through which current is supplyable to the resistor from a three wire feed, said switch having three input terminals to which the three feed wires are respectively connected and having three output terminals one of which is connected to an end of each part of the resistor and the other two of which are connected respectively to the other ends of the two parts of the resistor, a rotatable cam adjustable to five consecutive positions in which current is supplied to the resistor and to an additional consecutive position in which current supply to the resistor is interrupted, and a plurality of contact makers operated by the cam and individually adjustable thereby to provide respectively in the aforesaid five consecutive positions of the cam five different groups of two or more paths each between the input and output terminals.

13. In an electrical heating apparatus connectible to a plurality of conductors different pairs of which provide different electromotive forces, the combination of a plurality of resistors, switch means having a plurality of independently movable elements and a common operating means by which said elements are selectively operable, and means, including electrical connections, so constructed and arranged that said switch means is adapted for different positions of said common operating means respectively to selectively interconnect two of said resistors conjointly or one of said resistors alone with each of two different conductor pairs providing relatively high and low electromotive force respectively.

14. In an electrical heating apparatus connectible to three conductors, two different pairs of which provide relatively high and low electromotive forces respectively, the combination of a pair of resistors, switch means having a plurality of independently movable elements and a common operating means by which said elements are selectively operable, and means, including electrical connections, so constructed and arranged that said switch means is adapted for different positions of said common operating means respectively to selectively interconnect both of said resistors conjointly or one of said resistors alone with each of said conductor pairs and afford at least five different combinations of resistors and conductors whereby at least five different intensities of heat respectively are imparted to the resistors.

WILLIAM R. TUTTLE.